(12) United States Patent  
Balb et al.

(10) Patent No.: US 8,125,924 B2
(45) Date of Patent: Feb. 28, 2012

(54) METHOD AND DEVICES FOR TRANSFERRING DATA

(75) Inventors: Markus Balb, Unterhaching (DE); Dieter Gleis, Grosskarolinenfeld (DE)

(73) Assignee: Lantiq Deutschland GmbH, Neubiberg (DE)

( * ) Notice: Subject to any disclaimer, the term of this patent is extended or adjusted under 35 U.S.C. 154(b) by 661 days.

(21) Appl. No.: 11/814,478

(22) PCT Filed: Dec. 21, 2005

(86) PCT No.: PCT/EP2005/013787
§ 371 (c)(1),
(2), (4) Date: Jun. 19, 2008

(87) PCT Pub. No.: WO2006/076960
PCT Pub. Date: Jul. 27, 2006

(65) Prior Publication Data
US 2008/0285479 A1    Nov. 20, 2008

(30) Foreign Application Priority Data

Jan. 21, 2005   (DE) .................. 10 2005 003 016

(51) Int. Cl.
*G01R 31/08*    (2006.01)
(52) U.S. Cl. .................. 370/253; 370/384; 370/395.7
(58) Field of Classification Search .......... 370/250–255, 370/474, 465, 480, 230–235, 389–429, 468–473; 709/232, 233
See application file for complete search history.

(56) References Cited

U.S. PATENT DOCUMENTS

| 6,246,695 B1 * | 6/2001 | Seazholtz et al. ............. 370/468 |
| 6,680,940 B1 | 1/2004 | Lewin et al. |
| 6,963,538 B1 * | 11/2005 | Giroux et al. ............. 370/236.1 |
| 7,336,607 B2 * | 2/2008 | Samadi et al. ............. 370/230.1 |
| 2002/0080821 A1 * | 6/2002 | Hwang .................. 370/474 |
| 2002/0085505 A1 * | 7/2002 | Suda ..................... 370/253 |
| 2003/0210651 A1 * | 11/2003 | Tzeng et al. ............... 370/231 |
| 2003/0218981 A1 | 11/2003 | Scholten |
| 2004/0001435 A1 | 1/2004 | Wong |
| 2004/0013119 A1 * | 1/2004 | MeLampy et al. ....... 370/395.21 |

FOREIGN PATENT DOCUMENTS

| GB | 2361139 | * | 4/2000 |
| GB | 2 361 139 A | | 10/2001 |
| GB | 2361139 | * | 10/2001 |
| WO | WO 00/59176 | | 10/2000 |

OTHER PUBLICATIONS

GB 2361139, Oct. 2001, Flow control system for ethernet network devices, Bryan.*

(Continued)

*Primary Examiner* — Pao Sinkantarakorn
*Assistant Examiner* — Iqbal Zaidi
(74) *Attorney, Agent, or Firm* — Slater & Matsil, L.L.P.

(57) ABSTRACT

A method for transmitting data is disclosed, whereby data are transmitted in packets between a first device and a second device, whereby a further device disposed between the first device and the second device analyzes the packets at most for regeneration purposes. The second device transmits data between itself and a third device using DSL technology. During the data transmission between the first device and the second device a comparison of transmission rates takes place.

40 Claims, 1 Drawing Sheet

OTHER PUBLICATIONS

Borghs, E., et al., "Prototyping Ethernet in the First Mile over Point-to-Point Copper," Proceedings of the 13$^{th}$ IEEE International Workshop on Rapid System Prototyping, 2002, 6 pages, IEEE.

Liu, J., et al., "A Single Chip Solution of Dual-Gigabit Ethernet over 2.5G SDH/SONET," 2002, pp. 1310-1314, IEEE.

Vonnahme, E., et al., "Measurements in Switched Ethernet Networks Used for Automation Systems," WFCS-2000, Sep. 6-8, 2000, pp. 231-238, IEEE.

* cited by examiner

METHOD AND DEVICES FOR TRANSFERRING DATA

TECHNICAL FIELD

The present invention relates to a method, devices and a system for transmitting data in packets, whereby a loss of data is almost impossible and in particular a transmission rate is increased.

BACKGROUND OF THE INVENTION

Due to the increasing number of internet users and due to the increasing amounts of data that are moved uplink or downlink by a user of the internet, DSL technologies for transmitting data are becoming increasingly popular particularly on the so-called last or first mile (EFM=Ethernet in the First Mile) on the connection path to the internet user. Therefore transmitting data on this connection path should be as secure as possible, i.e., not tolerate any loss of data packets, and should have a transmission rate that is as high as possible. The EFM standard IEEE 802.3-2004, which standardises the transmitting of data on the so-called last mile, does not however always prevent a loss of data. If, for example, the data are received via a DSL connection from a device interacting in the first layer according to the OSI layer model and forwarded with a specific transmission rate to a device which has a medium access control (MAC), a loss of data can occur if the specific transmission rate is higher than a transmission rate at which the device which has the medium access control can forward this data.

SUMMARY OF THE INVENTION

According to the invention, a method for transmitting data is disclosed, whereby data are transmitted in packets between a first device and a second device, whereby a further device disposed between the first device and the second device analyzes the packets at most for regeneration purposes. The second device transmits data between itself and a third device using DSL technology. During the data transmission between the first device and the second device a comparison of transmission rates takes place.

BRIEF DESCRIPTION OF THE DRAWINGS

The present invention is explained further below with reference to the attached drawing on the basis of preferred embodiments.

DETAILED DESCRIPTION OF THE INVENTION

According to an embodiment of the invention, a method for transmitting data is provided whereby data are transmitted in packets between a first device and a second device. In particular, the first device has a medium access control and interacts only in the second layer according to the OSI layer model, while the second device processes its user data only in the first layer according to the OSI layer model. With this, packets transmitted between the first and the second device when data are transmitted between the first and the second device are analyzed at most for the purposes of regenerating the data transmitted in the packets. Furthermore, the second device is configured for transmitting data to a third device using DSL technology. The transmitting of data between the first device and the second device, in particular in both directions, is controlled by comparing transmission rates.

Since in particular when transmitting data from the first to the second device and also when transmitting data from the second to the first device the transmission rates are compared. Advantageously, no loss of data can occur when transmitting data bidirectionally between the first and second device, which can be the case conventionally, see the EFM standard 802.3-2004. Transmission rate comparison, or rather user data transmission rate comparison, is understood as meaning that the first (second) device sends user data to the second (first) device only at a transmission rate at which the second (first) device can then also process this user data. This prevents a loss of data from occurring if the first (second) device sends user data to the second (first) device at a transmission rate whereby this transmission rate exceeds a processing rate of the second (first) device. User data is understood to mean data that contain information that does not serve to control the first and second device and is transmitted unchanged from the first and second device.

According to a further embodiment of the invention, the transmission rate comparison can be achieved by means of two signals, a first and a second signal. If the first (second) device receives the first signal, it does not send any further data to the second (first) device until it receives the second signal or until a time interval has elapsed that is defined by the first signal. The first (second) device can send the first signal to the second (first) device if the first (second) device registers that a specific capacity of the memory elements of the first (second) device has been exceeded beyond a predetermined threshold value. In this, the memory elements store data that have been sent from the second (first) device but that could not yet be sent further or processed by the first (second) device. Another condition on the occurrence of which the first (second) device sends the first signal to the second (first) device may also be present if the memory elements of the first (second) device no longer offer any space to store more than or at least a maximum size data stream from the second (first) device within a specific time interval. In this, the time interval is determined by the time that elapses between a first and a second time-point. In this, the first (second) device decides to send the first signal to the second (first) device at the first time-point, whereby the second time-point is present if the first (second) device no longer receives any data from the second (first) device, as the first (second) device has sent the first signal to the second (first) device. In other words, the first (second) device sends the first signal to the second (first) device if the first (second) device registers that it cannot accept any more data from the second (first) device in its memory elements than those that are still being sent to it from the second (first) device until the data stream from the second (first) device is interrupted due to the first signal being received.

Conversely, the second signal is sent from the first (second) device to the second (first) device if the memory elements of the first (second) device again have sufficient space, e.g. because the first (second) . . . device has processed or passed on the data present in the memory elements.

With this procedure according to embodiments of the invention it is almost impossible for there to be a loss of data, in that the first (second) device sends data to the second (first) device which the second (first) device is not able to accept in its memory elements and must therefore reject.

Advantageously, the first (second) device can also send the first signal or the second signal to the second (first) device in a time interval between receiving the first signal and before receiving the second signal. Only the sending of other data is forbidden in this period. Furthermore, after evaluating this signal, the first and/or the second signal is immediately rejected in particular by the first (second) device.

This ensures that for its part the first (second) device can interrupt or re-establish the data stream from the second (first) device. In a situation where it is receiving the first signal the first (second) device can send no more data to the second (first) device, in that it is sending the first or the second signal to the second (first) device. By rejecting the first or the second signal after an evaluation it is furthermore ensured that the first or second signal does not use up any further resources, e.g. the memory elements, of the first (second) device.

A further possibility is that the first or second signal is produced by a specific Ethernet frame; for example, the first signal can be produced by a STOP-Ethernet frame or a PAUSE-frame and the second signal can be produced by a GO-Ethernet frame or a PAUSE-frame.

Since PAUSE-frames are used to compare transmission rates, advantageously, any device with a medium access control standardized in accordance with the Ethernet standard may be used as the first device.

It is also emphasized explicitly that the method according to a further embodiment of the invention also applies if transfer rates are compared, in particular using PAUSE-frames, only in one direction, namely only when transmitting data from the first to the second device or only when transmitting data from the second to the first device.

According to a further embodiment of the invention, the second device can extract a MAC sender address from a data packet that the second device receives from the third device via the DSL connection and use it as the MAC sender address of the specific Ethernet frame generated by the second device.

Since the second device extracts the MAC sender address from a data packet sent from a third device, advantageously, a MAC address does not have to be assigned to the second device, therefore the second device can then use this assigned MAC address to construct a correct Ethernet frame. As a result, advantageously, a standard device with medium access control may be used as the first device, since it is ensured that the Ethernet frames sent as the first or the second signal are also constructed by the second device with a correct MAC sender address. A standard device with medium access control is namely usually only able to evaluate Ethernet frames that have a correct MAC sender address.

Furthermore, data transmission between the first and the second device can be run in full duplex mode.

Since, according to the EFM standard IEEE 802.3-2004, transmission between the first and the second device is run only in half duplex mode, this means on the one hand a doubling of the possible transmission rate for transmitting data between the first and second device. On the other hand, the use of standard devices with medium access control as the first device is made easier, since standard devices with medium access control usually work only in full duplex mode.

The interface for transmitting data between the first and the second device may be selected from the following interfaces:

| | |
|---|---|
| MII | (Medium Independent Interface) |
| RMII | (Reduced Medium Independent Interface) |
| SMII | (Serial Medium Independent Interface) |
| SSSMII | (Source Synchronous Serial Medium Independent Interface) |

Moreover, according to a further embodiment of the invention, when transmitting data between the first and the second device, the Ethernet protocols 10Base-T (transmission rate of 10 Mbps) and 100Base-T (transmission rate of 100 Mbps) may be used.

According to a further embodiment of the invention, a device, which in particular processes its user data only in the first layer according to the OSI layer model, is also provided which comprises a first and a second interface unit. The first interface unit is configured to transmit data in packets and the second interface unit is configured to transmit data using DSL technology. During data transmission via the first interface unit the device is configured to compare transmission rates.

Additionally, according to embodiments of the present invention a further device, which is configured in particular for medium access control, is provided which comprises an interface unit and is configured to transmit data in packets via the interface unit with the device. The further device is configured such that during data transmission via the interface unit it performs a transmission rate comparison.

Finally, the present invention discloses an embodiment of a system for transmitting data that comprises a first and a second device. The first device, which is configured in particular for medium access control, and the second device, which processes its user data in particular in the first layer according to the OSI layer model, is configured to transmit data in packets between the first and second device. The second device is furthermore configured to transmit data between itself and a third device using DSL technology. Furthermore, the first and the second device are configured such that during data transmission between the first and the second device the transmission rates are compared.

If this system is integrated in a semiconductor circuit, the design of the interface between the first and second device is relatively open, because the interface is not accessible from outside the semiconductor circuit. In this case therefore the first and second signal are not usually produced by Ethernet frames, so the extracting of a MAC sender address from an Ethernet frame received from the second device does not occur.

Embodiments of the present invention is suited preferably for use in communication networks in which transmission to an end-node of the communication network is carried out with DSL technology. Naturally, the invention is however not limited to this preferred area of application, but can for example also be used in a detached communication node that exchanges data using DSL technology.

Hereinafter, embodiments of the invention will be described in more detail with reference to the drawings.

Figure 1:
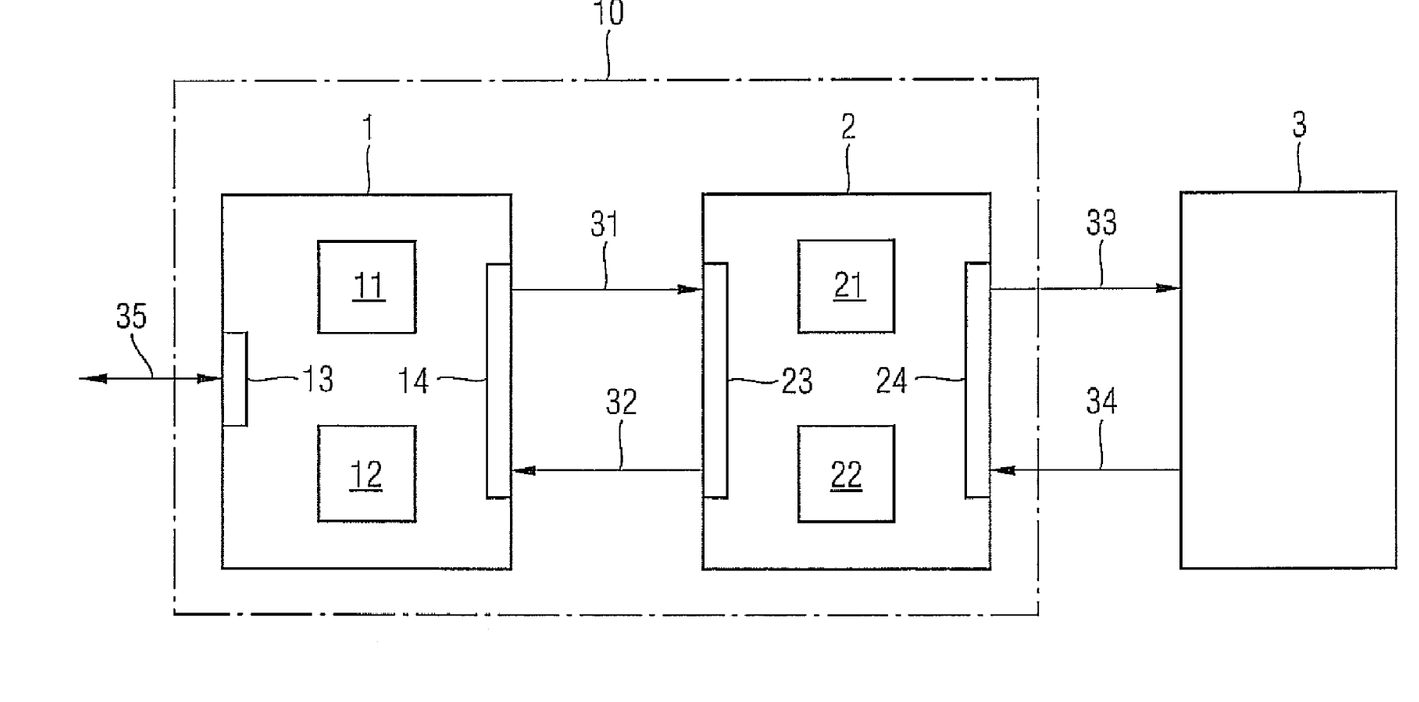
The sole FIGURE shows a system according to the invention with two devices according to the invention, which brings about the transmitting of data in packets.

In the sole FIGURE a system 10 that includes a first device 1 and a second device 2 and a third device 3 are shown which communicate via connections 33, 34 by means of DSL technology with Ethernet data (Ethernet protocol). The first device 1 is a communication device that via a first interface unit 13 has access to the internet through a connection 35. Furthermore, the first device 1 has a second interface unit 14 through which by packet-oriented data transmission 31, 32 it communicates with the second device 2. The first device 1 also comprises a first memory element 11 and a second memory element 12. In the first memory element 11 the first device 1 stores data that it has received via the first interface unit 13 but has not yet forwarded to the second device 2 via the second interface unit 14. Similarly, the first device stores in the second memory element 12 data that it has received from the second device 2 via the second interface unit 14 but has not yet forwarded via the first interface unit 13.

The second device 2 comprises a first interface unit 23 to communicate data with the first device 1 and a second interface unit 24 to communicate data with the third device 3 using DSL technology and also a first memory element 21 and a second memory element 22. In the first memory element 21 the second device 2 stores data that it has received via its first interface unit 23 but has not yet forwarded via its second interface unit 24. In the same way, the second device 2 stores, in the second memory element 22, data that it has received via the second interface unit 24 but has not yet forwarded via the first interface unit 23 to the first device 1.

The system 10 is integrated in a semiconductor circuit, which means that the connections 31, 32 between the first and second device 1, 2 are connections within this semiconductor circuit. The first and second device 1, 2 communicate with each other via a Medium Independent Interface (MII).

To simplify further description, below, the first device 1 is called MAC and the second device 2 is called EFM PHY. PHY stands for physical layer, as the EFM PHY 2 receives and sends its user data in this physical layer, the first layer according to the OSI layer model. The system 10 can belong to a customer premises equipment (CPE) or to a central office termination (COT).

The MAC 1 operates in the second layer according to the OSI layer model and is configured for medium access control (MAC), i.e. the first device 1 is able to work in accordance with a medium access control protocol. The medium access control protocol defines a method that determines a sequence in which certain devices temporarily have access to a transmission medium, to which the MAC 1 is also connected. On the other hand, the EFM PHY 2, as already indicated above, operates both in the first and also the second layer of the OSI layer model. With this, through the MII the EFM PHY 2 sends or receives its user data via the first layer to or from the MAC 1, while the EFM PHY 2 sends any PAUSE-frames via the second layer to the MAC 1 or receives them from the MAC. On the other hand, the MAC 1 sends or receives both user data and also any PAUSE-frames via the second layer to or from the EFM PHY 2. In doing so a characteristic of the MII is used to move data shown in the first layer to the second layer, and/or to move data shown in the second layer to the first layer, as a result of which the MAC 1 and the EFM PHY 2 can exchange user data via the MII, even though the MAC 1 sends and receives the user data via the second layer, while the EFM PHY 2 sends and receives the user data via the first layer.

It is explained below how data is communicated from the internet via the first interface unit 13 of the MAC 1 to the third device 3 and parallel to that data is communicated from the third device 3 to the internet.

Via its first interface unit 13 the MAC 1 receives data through the connection 35 that are intended to be forwarded to the EFM PHY 2. The MAC 1 collects this data in its first memory element 11, which is assigned to a connection between the MAC 1 and the EFM PHY 2, before it forwards it via its second interface unit 14 and the connection 31 to the EFM PHY 2. Similarly, the EFM PHY 2 collects data, which it receives via its first interface unit 23 from the MAC 1, in its first memory element 21, before forwarding it via its second interface unit 24 through the connection 33 to the third device 3.

Let it be assumed that the EFM PHY 2 is not able to forward to the third device 3 the data received from the MAC 1 at the same or a higher transmission rate at which the EFM PHY 2 receives this data from the MAC 1, as a result of which the first memory element 21 of the EFM PHY 2 slowly fills up. As soon as the EFM PHY 2 recognizes that a specific memory capacity of its first memory element 21 has been exceeded (e.g. more than 90%), the EFM PHY 2 sends a PAUSE-Ethernet frame (PAUSE-frame) to the MAC 1, with which it signals to the MAC 1 that for the time being the MAC 1 should not send any more data to the EFM PHY 2. To construct the PAUSE-frame correctly, the EFM PHY 2 has previously stored a MAC sender address from an Ethernet frame sent to it through the DSL connection 34, which the EFM PHY 2 now uses as the MAC sender address of the PAUSE-frame. Generally, through a parameter within the PAUSE-frame the EFM PHY 2 transmits a time interval in which the receiver of the PAUSE-frame, in this case the MAC 1, should not send data to the sender of the PAUSE-frame, in this case the EFM PHY 2. The MAC 1 analyses the PAUSE-frame and rejects it, i.e. it does not at any time store it in its second memory element 12 and neither does it forward it via its first interface unit 13. While the MAC 1 does not send any more data to the EFM PHY 2, the EFM PHY 2 sends the data in its first memory element 21 via its second interface unit 24 to the third device 3. There are now two possibilities for the MAC 1 to send data again to the EFM PHY 2. The first possibility is that the time interval set by the PAUSE-frame in the MAC 1 has expired, so the MAC 1 resumes the sending of data to the EFM PHY 2. The second possibility is that the EFM PHY 2 recognizes that its first memory element 21 has only been filled to a second specific degree or less (e.g. less than 10%), which is why the EFM PHY 2 sends a further PAUSE-frame, whereby the MAC CONTROL parameter of the PAUSE-frame is set at 0, as a result of which it is signalled to the MAC 1 that it can again send data to the EFM PHY 2, even if the time interval set by the PAUSE-frame sent before has not yet elapsed.

As the system 10 consisting of the first and second device operates in full duplex mode, parallel to receiving data from the MAC 1, for its part the EFM PHY 2 sends data that it receives via its second interface unit 24 from the third device 3 using DSL technology and in the meantime buffers in its second memory element 22, to the MAC 1. The MAC 1 stores this data, which the MAC 1 receives via its second interface unit 14 through the connection 32, in its second memory element 12 and then forwards it via its first interface unit 13 through the connection 35. If the MAC 1 is not able to forward the data received from the EFM PHY 2 quickly enough via its first interface unit 13, e.g. because the transmission rate at which the EFM PHY 2 sends its data to the MAC 1 is greater than the transmission rate at which the MAC 1 for its part forwards the data, the second memory element 12 of the MAC 1 fills up. As soon as the MAC 1 recognizes that its second memory element 12 has become full beyond a first certain degree, the MAC 1 sends a PAUSE-frame to the EFM PHY 2 to signal to the EFM PHY 2 not to send any more data to the MAC 1. The EFM PHY 2 analyses the PAUSE-frame it has received, rejects it, without storing it in its first memory element and without forwarding it to the third device, and does not send any more user data to the MAC 1. As soon as either the time interval set by the PAUSE-frame that has been sent has elapsed in the EFM PHY 2 or as soon as the EFM PHY 2 receives a PAUSE-frame from the MAC 1, in which the MAC CONTROL PARAMETER=0, the EFM PHY 2 resumes sending user data to the MAC 1.

Let it be noted that the MAC 1 can or may also send PAUSE-frames to the EFM PHY 2 if the MAC 1 has previously been prevented by the EFM PHY 2 by means of a PAUSE-frame from sending further data to the EFM PHY 2. This is useful for two reasons. Firstly, pause frames are not stored, so they do not increase the degree to which the corresponding memory element is full, because after evaluation they are immediately rejected by the receiver of the pause frame. Also, it must be possible for the MAC 1 or the EFM PHY 2 to signal to the EFM PHY 2 or the MAC 1 at any time not to send any more user data, as particularly in full duplex mode the EFM PHY 2 and the MAC 1 sends data to the MAC 1 or the EFM PHY 2 even if itself it is not receiving data from the MAC 1 or the EFM PHY 2, because the EFM PHY 2 or the MAC 1 have prevented this by means of a PAUSE-frame sent previously. Note also that the PAUSE-frames sent from the MAC 1 or the EFM PHY 2 correspond to the PAUSE-frames standardized in IEEE 802.3 Chapter 31.

With the exemplary method described above it is ensured that with the system 10, no loss of data can occur during the transmission of data between the MAC 1 and the EFM PHY 2 by the sender sending user data to the receiver at a higher transmission rate than the receiver can process or forward this data.

Instead of the PAUSE-frame, the system 10 shown in the FIGURE can also use STOP-Ethernet frames and GO-Ethernet frames. In this, the MAC 1 or the EFM PHY 2 sends a STOP-frame in order to prevent the further sending of user data from the EFM PHY 2 or the MAC 1. Because a time interval cannot be set with the STOP-frame and the GO-frame, the MAC 1 or the EFM PHY 2 must in any event send a GO-frame in order to signal to the EFM PHY 2 or the MAC 1 that it can continue to send user data.

The invention claimed is:

1. A method for transmitting data, the method comprising:
   transmitting data in packets between a first device and a second device, wherein the data are transmitted from the second device to the first device with a first transmission rate and wherein the data are transmitted from the first device to the second device with a second transmission rate;
   adjusting the first transmission rate to a first processing rate of the first device or adjusting the second transmission rate to a second processing rate of the second device;
   sending a first signal from the first device to the second device, on receipt of which the second device does not send any more data to the first device until a time predetermined by the first signal has elapsed, if a first condition is satisfied, the first condition being selected from the group consisting of:
   (i) memory elements of the first device are filled beyond a predetermined first threshold value with data from the second device that could not yet be sent further from the first device, and
   (ii) the memory elements of the first device do not offer any more space to store at least a maximum size data stream from the second device which streams for a time interval whereby the time interval is the time that elapses from a time-point at which the first device decides to send the first signal to the second device until a time-point at which because of the first signal that has been sent no more data from the second device are received by the first device; or
   sending a second signal from the first device to the second device, upon receipt of which the second device sends data that are to be sent to the first device if a second condition is satisfied, the second condition being selected from the group consisting of:
   (i) the memory elements of the first device are filled below a predetermined second threshold value, and
   (ii) the memo elements of the first device offering at least sufficient space to store the maximum size data stream from the second device that streams for the time interval.

2. The method according to claim 1, wherein transmitting data between the first device and the second device is run in full duplex mode.

3. The method according to claim 1, wherein transmitting data between the first device and the second device comprises selecting an interface, the interface comprising a Medium Independent Interface (MID, a Reduced Medium Independent Interface (RMII), a Serial Medium Independent Interface (SMII) or a Source Synchronous Serial Medium Independent Interface (SSSMII) interface.

4. The method according to claim 1, wherein transmitting data between the first device and the second device comprises using a 10-Base-T or 100-Base-T Ethernet protocol.

5. The method according to claim 1, wherein the first device operates only in a second layer according to an Open Systems Interconnection (OSI) layer model and/or in that the second device processes its user data only in a first layer according to the Open Systems Interconnection (OSI) layer model.

6. The method according to claim 1, wherein the first device and the second device are disposed together on a circuit board and/or the first device and the second device are together integrated in a semiconductor circuit.

7. The method according to claim 1, wherein adjusting the first transmission rate to the first processing rate comprises sending user data to the first device only at a transmission rate at which the first device can forward the user data and wherein adjusting the second transmission rate to the second processing rate comprises sending user data to the second device only at a transmission rate at which the second device can forward the user data.

8. The method according to claim 1, wherein transmitting data in packets between the first device and the second device comprises transmitting data between the second device and the first device via a first communication connection and transmitting data between the first device and the second device via a second communication connection.

9. The method according to claim 1, further comprising transmitting the data between the second device and a third device.

10. A system for transmitting data, the system comprising:
    a first device comprising
       a first interface unit that is configured such that data can be exchanged in packets via the first interface unit using a transmission rate; and
       a second interface unit that is configured such that data can be exchanged via the second interface unit; and
    a second device, wherein the device is configured to adjust the transmission rate to a processing rate of the first device when transmitting data via the first interface unit to the first device,
    wherein a first signal is sent from the first device to the second device, on receipt of which the second device does not send any more data to the first device until a time predetermined by the first signal has elapsed or until a second signal is sent from the first device and received by the second device, if a first condition is satisfied, the first condition being selected from the group consisting of:
    (i) memory elements of the first device are filled beyond a predetermined first threshold value with data from the second device that could not yet be sent further from the first device, and
    (ii) the memory elements of the first device do not offer any more space to store at least a maximum size data stream from the second device which streams for a time interval whereby the time interval is the time that elapses from a time-point at which the first device decides to send the first signal to the second device until a time-point at which because of the first signal that has been sent no more data from the second device are received by the first device, and wherein the second signal is sent from the first device to the second device, upon receipt of which the second device sends data that are to be sent to the first device if a second condition is satisfied, the second condition being selected from the group consisting of:

(i) the memory elements of the first device are filled below a predetermined second threshold value, and (ii) the memory elements of the first device offering at least sufficient space to store the maximum size data stream from the second device that streams for the time interval.

11. The system according to claim 10, wherein the first device is configured such that it processes its user data only in a first layer according to an Open Systems Interconnection (OSI) layer model.

12. The device according to claim 10, wherein the first device is configured to adjust the transmission rate to the processing rate of the second device comprises the device is configured to send user data to the second device only at a transmission rate at which the second device can forward the user data.

13. The system according to claim 10, further comprising a communication connection between the device and the second device, wherein the communication connection is configured to transport data from the second device to the first device.

14. A system for transmitting data, the system comprising a first device and a second device, the first device comprising an interface unit, the first device being configured to transmit data in packets to the second device via the interface unit using a transmission rate, the second device being configured such that data can be exchanged in packets via a first interface unit of the second device with the first device and that data can be exchanged via a second interface unit of the second device, wherein the first device is configured to adjust the transmission rate to a processing rate of the second device when transmitting data via the interface unit, wherein a first signal is sent from the second device to the first device, on receipt of which the first device does not send any more data to the second device until a time predetermined by the first signal has elapsed or until a second signal is sent from the second device and received by the first device, if a first condition is satisfied, the first condition being selected from the group consisting of:

(i) memory elements of the second device are filled beyond a predetermined first threshold value with data from the first device that could not yet be sent further from the second device, and (ii) the memory elements of the second device do not offer any more space to store at least a maximum size data stream from the first device which streams for a time interval whereby the time interval is the time that elapses from a time-point at which the second device decides to send the first signal to the first device until a time-point at which because of the first signal that has been sent no more data from the first device are received by the second device, and wherein the second signal is sent from the second device to the first device, upon receipt of which the first device sends data that are to be sent to the second device if a second condition is satisfied, the second condition being selected from the group consisting of:

(i) the memory elements of the second device are filled below a predetermined second threshold value, and (ii) the memory elements of the second device offering at least sufficient space to store the maximum size data stream from the first device that streams for the time interval.

15. The system according to claim 14, wherein the first device is configured for medium access control and is additionally configured such that it operates only in a second layer according to an Open Systems Interconnection (OSI) layer model.

16. The device according to claim 14, wherein the first device is configured to adjust the transmission rate to the processing rate of the second device comprises the first device is configured to send user data to the second device only at a transmission rate at which the second device can forward the user data.

17. The system according to claim 14, further comprising a communication connection between the first device and the second device, wherein the communication connection is configured to transport data from the first device to the second device.

18. A system for transmitting data, the system comprising:
a first device;
a second device wherein the system is configured to transmit data in packets between the first device and the second device, wherein during the data transmission between the first device and the second device the system is configured to adjust transmission rates, wherein the second device is further configured to transmit data from itself to a third device, wherein the first device comprises an interface unit and is configured to transmit data in packets to the second device via the interface unit, the first device being configured to adjust a first transmission rate to a data second processing rate of the second device when transmitting data via the interface unit;

wherein the second device comprises a first interface unit that is configured such that data can be exchanged in packets with the first device via the first interface unit, and wherein the second device comprises a second interface unit that is configured such that data can be exchanged via the second interface unit, the second device being configured to adjust a second transmission rate to a data first processing rate of the first device when transmitting data via the first interface unit;

wherein a first signal is sent from the first device to the second device, on receipt of which the second device does not send any more data to the first device until a time predetermined by the first signal has elapsed or until a second signal is sent from the first device and received by the second device, if a first condition is satisfied, the first condition being selected from the group consisting of:

(i) memory elements of the first device are filled beyond a predetermined first threshold value with data from the second device that could not yet be sent further from the first device, and (ii) the memory elements of the first device do not offer any more space to store at least a maximum size data stream from the second device which streams for a time interval whereby the time interval is the time that elapses from a time-point at which the first device decides to send the first signal to the second device until a time-point at which because of the first signal that has been sent no more data from the second device are received by the first device, and wherein the second signal is sent from the first device to the second device, upon receipt of which the second device sends data that are to be sent to the first device if a second condition is satisfied, the second condition being selected from the group consisting of:
(i) the memory elements of the first device are filled below a predetermined second threshold value, and
(ii) the memory elements of the first device offering at least sufficient space to store the maximum size data stream from the second device that streams for the time interval.

19. The system according to claim 18, wherein the system is configured on a circuit board as an assembly.

20. The system according to claim 18, wherein the system is configured as a single-chip, integrated circuit.

21. The system according to claim 18, wherein the first device is configured for medium access control and is additionally configured such that it operates only in a second layer according to an Open Systems Interconnection (OSI) layer model.

22. The system according to claim 18, wherein the second device is configured such that it processes its user data only in a first layer according to an Open Systems Interconnection (OSI) layer model.

23. The system according to claim 18, wherein the first device is configured to adjust the first transmission rate to the second data processing rate of the second device comprises the first device is configured to send user data to the second device only at a transmission rate at which the second device can forward the user data and wherein the second device is configured to adjust the second transmission rate to the first data processing rate of the first device comprises the second device is configured to send user data to the first device only at a transmission rate at which the first device can forward the user data.

24. The system according to claim 18, further comprising a first communication connection between the first device and the second device, wherein the first communication connection is configured to transport data from the first device to the second device, and second communication connection between the second device and the first device, wherein the second communication connection is configured to transport data form the second device to the first device.

25. A method for transmitting data, the method comprising:
transmitting data in packets between a first device and a second device, wherein the data are transmitted from the second device to the first device with a first transmission rate and wherein the data are transmitted from the first device to the second device with a second transmission rate;
adjusting the first transmission rate to a first processing rate of the first device or adjusting the second transmission rate to a second processing rate of the second device; and
transmitting the data between the second device and a third device,
wherein a first signal is sent from the first device to the second device, on receipt of which the second device does not send any more data to the first device until a time predetermined by the first signal has elapsed or until a second signal is sent from the first device and received by the second device, if a first condition is satisfied, the first condition being selected from the group consisting of:
(i) memory elements of the first device are filled beyond a predetermined first threshold value with data from the second device that could not yet be sent further from the first device, and
(ii) the memory elements of the first device do not offer any more space to store at least a maximum size data stream from the second device which streams for a time interval whereby the time interval is the time that elapses from a time-point at which the first device decides to send the first signal to the second device until a time-point at which because of the first signal that has been sent no more data from the second device are received by the first device, and
wherein the second signal is sent from the first device to the second device, upon receipt of which the second device sends data that are to be sent to the first device if a second condition is satisfied, the second condition being selected from the group consisting of:
(i) the memory elements of the first device are filled below a predetermined second threshold value, and
(ii) the memory elements of the first device offering at least sufficient space to store the maximum size data stream from the second device that streams for the time interval.

26. The method according to claim 25, wherein a third signal is sent from the second device to the first device, upon receipt of which the first device does not send any more data to the second device until the time predetermined by the third signal has elapsed or until a fourth signal is sent from the second device and received by the first device, if a third condition is satisfied, the third condition being selected from the group consisting of:
(i) memory elements of the second device are filled beyond a predetermined third threshold value with data from the first device that could not yet be sent further from the second device, and
(ii) the memory elements of the second device do not offer any more space to store at least a maximum size data stream from the first device which streams for a further time interval whereby the further time interval is the time that elapses from a time-point at which the second device decides to send the third signal to the first device until a time-point at which because of the signal that has been sent no more data from the first device are received by the second device.

27. The method according to claim 26, wherein the fourth signal is sent from the second device to the first device, upon receipt of which the first device sends data that are to be sent to the second device if a fourth condition is satisfied, the fourth condition being selected from the group consisting of:
(i) the memory elements of the second device are filled below a predetermined fourth threshold value, and
(ii) the memory elements of the second device offering at least sufficient space to store the maximum size data stream from the first device that streams for the time interval.

28. The method according to claim 27, wherein, after receiving the first or third signal and before receiving the second or fourth signal, the first device and/or the second device send only the first or third signal, or the second or fourth signal to the other device, respectively.

29. The method according to claim 27, wherein, after being evaluated, the first or third signal and/or the second or fourth signal is/are rejected immediately.

30. The method according to claim 27, wherein the first or third signal and/or the second or fourth signal is/are produced by a specific frame.

31. The method according to claim 30, wherein the specific frame is an Ethernet frame.

32. The method according to claim 31, wherein the first or third signal is produced by a STOP-Ethernet frame and/or the second or fourth signal is produced by a GO-Ethernet frame, wherein after receiving the STOP-Ethernet frame, a receiver of the STOP-Ethernet frame does not send any more user data to a sender of the STOP-Ethernet frame until the receiver receives the GO-Ethernet frame from the sender.

33. The method according to claim 31, wherein the first or third signal and/or the second or fourth signal is/are produced by a PAUSE-Ethernet frame.

34. The method according to claim 31, wherein the second device uses as a Medium Access Control (MAC) sender address of the Ethernet frame a MAC sender address from a data packet which the second device receives from the third device.

35. The method according to claim 25, wherein when checking whether the memory elements offer sufficient space to accept the maximum size data stream, a predetermined quantity of data is taken into account as a safety buffer.

36. A system for transmitting data comprising:
a first device comprising
a first interface unit that is configured such that data can be exchanged in packets via the first interface unit using a transmission rate;
a second interface unit that is configured such that data can be exchanged via the second interface unit; and
a second device, wherein the second device is configured to adjust the transmission rate to a processing rate of the first device when transmitting data via the first interface unit to the first device,
wherein the first device further comprises memory elements, wherein data is stored that the first device receives via the first interface unit but has not yet processed further, wherein the first device is configured to send a first signal via the first interface unit if the first device registers that a specific capacity of the memory elements has been filled beyond a predetermined first threshold value, or if the first device registers that the memory elements no longer offer space to store at least a maximum size data stream that is received via the first interface unit which streams for a time interval, wherein the time interval is the tune that elapses from a time-point at which the first device decides to send the first signal until a time-point at which due to the first signal that has been sent no more data is received by the first device via the first interface unit, wherein the first device is configured to send a second signal via the first interface unit if the first device registers that the memory elements are filled below a predetermined second threshold value, or if the first device registers that the memory elements offer at least sufficient space to store the maximum size data stream from the first interface unit that streams for the time interval, and wherein the second device is configured such that the second device, if the second device receives the first signal, does not send any more data via the first interface unit, except for the first and second signal, until a time predetermined by the first signal has elapsed or until the first device receives the second signal via the first interface unit.

37. A first device comprising:
a first interface unit that is configured such that data can be exchanged in packets via the first interface unit using a transmission rate;
a second interface unit that is configured such that data can be exchanged via the second interface unit; and
a processor configured to receive data via the first interface from a second device, wherein the second device is configured to adjust the transmission rate to a processing rate of the first device when transmitting data,
wherein the first device is configured to send a first signal to the second device, on receipt of which the second device does not send any more data to the first device until a time predetermined by the first signal has elapsed or until a second signal is sent from the first device and received by the second device, if a first condition is satisfied, the first condition being selected from the group consisting of:
(i) memory elements of the first device are filled beyond a predetermined first threshold value with data from the second device that could not yet be sent further from the first device, and
(ii) the memory elements of the first device do not offer any more space to store at least a maximum size data stream from the second device which streams for a time interval whereby the time interval is the time that elapses from a time-point at which the first device decides to send the first signal to the second device until a time-point at which because of the first signal that has been sent no more data from the second device are received by the first device, and
wherein the second signal is sent from the first device to the second device, upon receipt of which the second device sends data that are to be sent to the first device if a second condition is satisfied, the second condition being selected from the group consisting of:
(i) the memory elements of the first device are filled below a predetermined second threshold value, and
(ii) the memory elements of the first device offering at least sufficient space to store the maximum size data stream from the second device that streams for the time interval.

38. The first device according to claim 37, wherein the first interface comprises a Medium Independent Interface (MII), a Reduced Medium Independent Interface (RMII), a Serial Medium Independent Interface (SMII) or a Source Synchronous Serial Medium Independent Interface (SSSMII) interface.

39. The first device according to claim 37, wherein the first device operates only in a second layer according to an Open Systems Interconnection (OSI) layer model and/or in that the second device processes its user data only in a first layer according to the Open Systems Interconnection (OSI) layer model.

40. The first device according to claim 37, wherein the first device and the second device are disposed together on a circuit board and/or the first device and the second device are together integrated in a semiconductor circuit.

* * * * *

UNITED STATES PATENT AND TRADEMARK OFFICE
CERTIFICATE OF CORRECTION

PATENT NO.        : 8,125,924 B2
APPLICATION NO.   : 11/814478
DATED             : February 28, 2012
INVENTOR(S)       : Balb et al.

Page 1 of 1

It is certified that error appears in the above-identified patent and that said Letters Patent is hereby corrected as shown below:

In Col. 8, line 7, claim 3, delete "(MID" and insert --(MII)--.
In Col. 8, line 48, claim 10, before "device is configured" insert --second--.
In Col. 13, line 39, claim 36, delete "tune" and insert --time--.

Signed and Sealed this
Twenty-sixth Day of June, 2012

David J. Kappos
*Director of the United States Patent and Trademark Office*